March 22, 1927.
C. M. MILLER
1,621,745
WELDING ROD HOLDER
Filed March 25, 1925
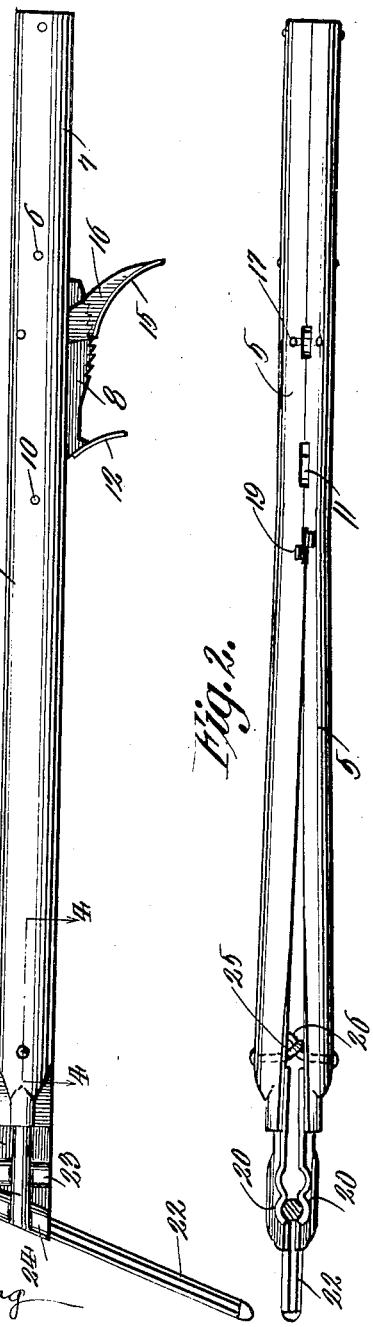
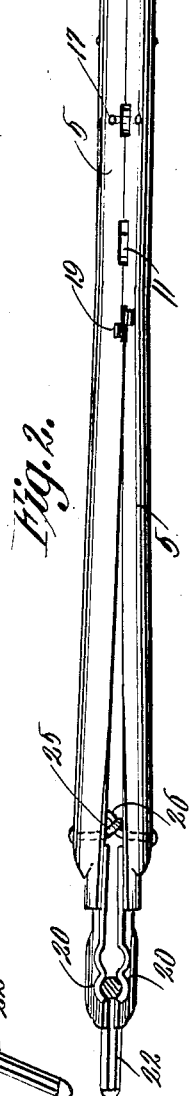
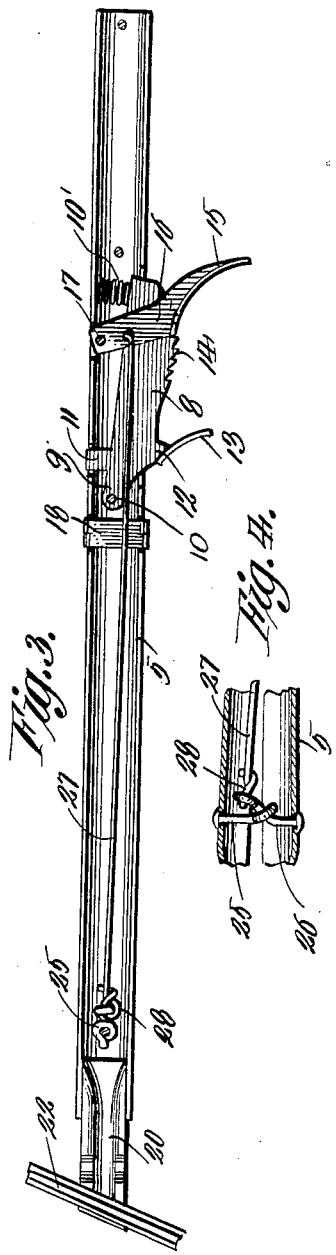
WITNESSES
Inventor
CLYDE M. MILLER
By Richard B. Owen
Attorney Patented Mar. 22, 1927.

1,621,745

UNITED STATES PATENT OFFICE.

CLYDE M. MILLER, OF MADISON, INDIANA.

WELDING-ROD HOLDER.

Application filed March 25, 1925. Serial No. 18,321.

This invention relates to improvements in apparatus for molding welding rods and the like.

An important object of the invention is to provide an apparatus of the above character whereby welding rods and similar devices may be firmly held in desired positions.

A further object of the invention is to provide a device of this kind provided with means for securely gripping welding rods and conveniently holding same in position during operation.

A still further object of the invention is the provision of an apparatus having means associated therewith for engaging a welding rod and efficiently holding the same in various positions to permit convenient application thereof upon the work.

A still further object of the invention is the provision of a device of the above mentioned character which is comparatively simple and durable of construction and efficient for the purpose intended.

Other objects and advantages of this invention will become apparent as the description progresses.

In the accompanying drawing forming a part of this specification and in which like numerals are employed to designate corresponding parts throughout the same:

Figure 1 is a side elevation of the device comprising my invention shown in operative position, Figure 2 is a top plan view of the same, Figure 3 is a longitudinal sectional view taken through the device, and Figure 4 is a sectional view taken on the line 4—4 of Figure 1.

In the drawing, wherein for the purpose of illustration is shown the preferred embodiment of my invention, the numeral 5 generally designates the body of my improved device composed in this instance of a pair of semi-circular complementary sections engageable to form a substantially tubular member. These sections are connected by a plurality of rivets 6 driven through suitable openings in the sections to maintain the same in cylindrical relation. One end of the body designated by the numeral 7 is adapted to form a handle portion and is provided with co-acting recesses to permit the application of a bracket plate 8.

One extremity of the plate 8 is provided with a reduced apertured extension 9 connecting with a suitable pivot pin 10 positioned through the body permitting swinging movement of the plate. The opposite end of the plate is normally forced outwardly through the recesses formed in the body section by means of a coiled compression spring 10' secured to the plate and body for this purpose. Formed on the intermediate portion of the body adjacent the apertured extension is a transversely extending lug 11 extending from the inner edge of the plate and engageable with a suitable recess formed in the body, this lug being adapted to retain the plate in alignment. The outer edge of the plate carries a tapered extension 12 substantially opposed to the lug 11 adapted for the connection of an arcuate trigger member 13 by means of which the plate is swung inwardly relative to the body sections. Formed upon the outer edge of the plate 8 adjacent one end thereof are a plurality of teeth 14 engageable with an arcuate plate 15 formed transversely on the lower portion of a pivoted lever 16, the upper extremity of this lever being apertured and engaging a lever pivot pin 17. It is to be noted that the arcuate plate 15 is formed on the lower edge of the lever and extends from either side thereof, the extension upon one side being engageable with the teeth 14 for holding the lever in operative position.

The intermediate portion of the body 5 is reinforced by a transversely extending strip 18 the upper and lower extremities being provided with ears 19 bent about the outer sides of the body section.

The opposite extremities of the body sections carry a pair of opposed jaw members 20 formed integral with the body sections or secured thereto by welding or in any suitable manner. Each of these jaws extends in alignment with the body sections and is provided with a longitudinal ridge 21 formed in the center of and extending longitudinally with the jaws. These grooves are positioned in co-acting relationship forming complementary gripping members for engagement with a suitable welding rod indicated by the reference 22. The jaws are also provided with transversely extending ridges 23 formed adjacent the extremities in opposed relation in order to hold a welding rod in a transverse position relative to the body of the device. As it is often desirable to hold the welding rod in an angular position relative to the body, I provide the extremities of the jaws with angular extending ridges 24 oppositely disposed to permit firmly engaging the welding rod. Thus it is seen that the welding rod or like device may be mounted in the jaws of my improved device in any desirable position a feature very essential upon various welding operations.

It is to be noted that the extremities of the body sections upon which the jaws 20 are mounted normally assume expanded positions, that is, the sections are constructed of resilient material such as steel and are so formed as to cause the extremities to be normally spread apart. It is then necessary to provide means whereby the jaws will be forced into contracted positions for firmly engaging the welding rod and permit the operator to focus his attention upon the welding operation. This is accomplished in the following manner.

One of the sections carry a member generally in the form of an eye bolt as at 25 receiving through the eye thereof a similar member 26 secured opposite thereto upon the complementary section. An operating rod 27 extends through the body, one extremity thereof connecting with the eye bolt 26 by means of a link 28 and the opposite extremity connecting with the intermediate portion of the lever 16.

In operating my improved device, the jaws are normally retained in open formation and the welding rod 22 positioned in the desired grooves. The lever 16 is then engaged by the finger of the operator and drawn toward the handle end of the body, the plate formed on the lever engaging the teeth 14 and retaining same in a locked position. This movement of the lever will naturally draw the rod toward the handle portion of the body and have a tightening effect upon the eye bolts 25 and 26 causing the jaws 20 to contract and tightly grip the welding rod. The operator may then place his entire attention upon the welding operation and be assured that the rod will remain in position upon the device. When it is desirable to remove the rod the trigger 13 is actuated causing the plate 8 to swing inwardly toward the body thereby releasing the teeth 14 from the lever which will be caused to swing toward the jaw end of the body and release the resilient extremities of the sections which will resume their normally expanded positions and release the rod.

It will be readily apparent that this device provides a structure which will positively grip the welding rod and prevent accidental movement thereof relative to the gripping jaws. It is furthermore seen that the rod may be secured in longitudinal, transverse or angular positions relative to the alignment of the body to permit convenient operation during the welding process in what would otherwise be inaccessible positions.

It is to be understood that the form of my invention herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. A welding rod holder including a body formed on a pair of complementary sections one extremity of each of the said sections normally assuming an expanded position, oppositely disposed jaws carried by the ends of the sections, a plurality of co-acting ridges formed in each jaw adapted to retain a welding rod in various positions, a pair of eye bolts secured adjacent the said extremities of the body sections, a movable plate member mounted adjacent the opposite extremity of the body, a lever pivoted beside the plate engageable therewith, a rod connecting the said lever and eye bolts for contracting the sections, and means for locking the said lever in adjusted positions.

2. A tool of the class described including a body having jaws formed on one end thereof, means for actuating the jaws to gripping position including interfitting eye members, an operating rod secured at one end to one of the eye members and adapted to contract the eye members, a lever pivotally associated with the body and connected with the opposite end of the operating rod to operate the eye members and jaws, a lateral extension formed on the said lever, a pivoted bracket member associated with the body adjacent the lever and having teeth formed on the exterior edge in engagement with the lateral extension on the lever, a trigger formed on the bracket member for pivotal movement of the bracket, and spring means adapted to normally urge the bracket member to operative position in engagement with the lever extension and operable to disengage the lever extension for expansion of the jaws.

3. In a tool of the character described, a body having jaws formed on one end adapted to normally assume expanded positions, eye members secured to the jaws and arranged in interfitting positions for contraction of the jaws, an operating rod having one end secured to one of the eye members and adapted to contract the same, a lever pivotally associated with the body and having the opposite end of the operating rod secured thereto, a lateral projection formed on the intermediate portion of the said operating lever, a bracket member hingedly connected with the body movable in a position adjacent the lever, teeth formed on the outer edge of the bracket engageable with the lateral extension on the lever, a trigger member secured to the forward portion of the bracket to operate the same so as to release the lever, and spring means adapted to normally urge the bracket member to a protracted position engageable with the lever projection to lock the jaws in gripping position.

4. A tool of the class described including a body having a handle portion formed on one end and jaw carrying portions formed at the opposite end, the said jaw carrying portions normally assuming diverging expanding positions, jaws secured upon the jaw carrying portions of the body, coacting ridges formed in the jaws at angular inclinations to engage a welding rod in vertical, horizontal and angular positions, eye members secured to the expanded portions of the body operatively associated for contraction thereof, an operating rod secured to one of the eye members, and means for operating the said eye members and jaws so that the latter may assume expanded released positions or contracted gripping positions.

In testimony whereof I affix my signature.

CYLDE M. MILLER.